United States Patent [19]

Delaquis et al.

[11] Patent Number: 5,730,045
[45] Date of Patent: Mar. 24, 1998

[54] COOKWARE

[75] Inventors: Michel Delaquis; Fred Coakes, both of Winnipeg, Canada

[73] Assignee: Easy Strain Cookware, Winnipeg, Canada

[21] Appl. No.: 834,127

[22] Filed: Apr. 14, 1997

[51] Int. Cl.⁶ .............. A47J 27/00; A47J 27/06; A47J 27/21; B01D 35/02
[52] U.S. Cl. .............. 99/337; 99/403; 99/410; 210/464; 210/469; 220/316; 220/912
[58] Field of Search .............. 99/339, 340, 337, 99/338, 403–418; 210/464–469, 245; 220/287, 367.1, 314–316, 370–372, 912, 325, 324, 354, 369; 126/369, 20; 222/466; 294/31.1; D7/391, 538

[56] References Cited

U.S. PATENT DOCUMENTS

| 173,766 | 2/1876 | Clements . | |
|---|---|---|---|
| 472,002 | 3/1892 | Ross et al. . | |
| 817,476 | 4/1906 | Elsner . | |
| 931,209 | 8/1909 | Lincoln . | |
| 1,259,183 | 3/1918 | Wildy | 210/469 |
| 1,314,180 | 8/1919 | Ayres . | |
| 1,624,926 | 4/1927 | Chovanec . | |
| 1,781,995 | 11/1930 | Alexander | 210/469 |
| 2,171,982 | 9/1939 | Holbrook | 210/49 |
| 2,303,841 | 12/1942 | Kircher | 210/464 |
| 2,907,467 | 10/1959 | Machate, Jr. | 210/469 |
| 3,065,855 | 11/1962 | Edwards | 210/469 |
| 3,269,545 | 8/1966 | Udel | 99/337 |
| 3,289,849 | 12/1966 | Livingston et al. . | |
| 4,091,956 | 5/1978 | Vecchio . | |
| 4,310,418 | 1/1982 | Busbey | 210/467 |
| 4,512,497 | 4/1985 | Grusin | D7/538 |
| 4,828,140 | 5/1989 | Henderson | 220/369 |
| 5,178,761 | 1/1993 | Mohun | 99/403 |
| 5,613,618 | 3/1997 | Raoult | 99/410 |
| 5,615,607 | 4/1997 | Delaquis et al. | 99/403 X |

FOREIGN PATENT DOCUMENTS

| 16536 | 3/1883 | Canada . |
|---|---|---|
| 29070 | 1/1888 | Canada . |
| 57737 | 10/1897 | Canada . |
| 72249 | 7/1901 | Canada . |
| 117162 | 4/1909 | Canada . |
| 197263 | 2/1920 | Canada . |
| 379209 | 1/1939 | Canada . |

OTHER PUBLICATIONS

Revere Excel Cookware Product Brochure From Regal Ware, Inc., (Date Unknown).

Primary Examiner—Timothy F. Simone

[57] ABSTRACT

The present invention relates to a cooking apparatus to facilitate straining requirements. The cooking apparatus includes a pot and lid that can be securely integrated to function as a strainer. The lid includes a circumferentially extending flange that is designed to slide into the pot and rest on the rim of the pot. The flange includes a pair of opposing perforation regions and a pair of opposing protrusion elements. The pot includes a corresponding pair of notches and channels to receiving the protrusion elements to secure the lid to the pot. In a straining position the lid is secured to the pot, with the protrusion elements positioned in the channels and with the perforations regions aligned with dipped outer edges in the rim of the pot to facilitate pouring and straining. In a non-straining position the lid is merely resting in the notches to permit easy removal of the lid. In the non-straining position the perforations regions are covered by the inner sides of the pot to limit the escape of steam during cooking operations.

12 Claims, 2 Drawing Sheets 5,730,045

COOKWARE

FIELD OF THE INVENTION

This invention relates to the field of cookware. In particular, the present invention relates to cookware adapted to direct the release of steam and provide a system to incorporate a strainer in a lid for dispensing liquid.

BACKGROUND OF THE INVENTION

The preparation of routine meals commonly includes preparing foods such as vegetables, potatoes and pastas. Traditional cooking methods for such foods involve boiling in water and later draining, thereby employing the use of both a pot and a strainer.

It is known as common practice, when time is limited or a strainer is not available, to employ the lid as a barrier to escaping food and skillfully attempt to dispense the steaming liquid from the pot. This creates a dangerous situation whereby steam and hot liquid escape uncontrollably from the pot. Furthermore, this practice frequently results in the loss of food.

There have been several attempts in the prior art to simplify the art of cooking. Many of which have been directed towards the modification of lids for cookware to eliminate the requirement of a strainer.

For example, U.S. Pat. No. 1,259,183 issued on Mar. 12, 1918 to Wildy, discloses a pot and cover combination where one side of the top of the pot is provided with an offset perforated extension to act as a strainer when pouring the contents from the pot.

U.S. Pat. No. 2,907,467 issued on Oct. 6, 1959 to Machate describes concavo-convex cover for pots in the form of a segment of a sphere for engaging rims of pots of different diameters. The cover includes a vent region consisting of perforations at a peripheral edge of the cover to facilitate straining operations.

However, these prior art pot straining systems are not successful in providing a convenient cooking apparatus capable of safely and efficiently straining its contents. In particular, in the Wildy device the pouring spout is on the opposite side of the strainer. Half of the lid is a strainer that is covered by a flap that opens by the pressure of the contents when the pot is tilted, which prevents accurate draining and can cause unsafe splashing of hot water. In addition, the Machate lid does not include a locking mechanism for retention on the pot during pouring functions. The operator must apply pressure on the knob to keep the lid from separating from the pot, which provides no advantages over traditional lid-based straining discussed above.

Consequently, there is a need for cookware that provides a safe and efficient mechanism for in-pot straining and additionally allows for accurate pouring and simple cleaning.

SUMMARY OF THE INVENTION

An object of the present invention is to provide cookware that is adapted to safely drain liquids from the pot using the lid.

An object of a preferred form of the present invention is to provide cookware that has a lid that locks securely to the pot and provides a straining mechanism within the lid.

In accordance with one aspect of the present invention there is provided a cooking apparatus, comprising: (a) a container for receiving items to be cooked, said container having a rim surrounding an open region having inner sides; said rim having a pouring region; (b) a lid adapted to cover said open region and a portion of the rim of the container, said lid includes a flange adapted to slidably engage with the inner sides of the container; said flange having a region of perforations; and (c) means for securing the lid to the container; said lid being operable between a first and second position; where in said first position the lid is secured to the container by the means for securing and the region of perforations of the flange is in fluid communication with the pouring region of the rim, whereby the items in the container can be strained; and in said second position the lid is released from the means for securing and the region of perforations in the flange is covered by the inner sides of the container.

In accordance with another aspect of the present invention there is provided cooking apparatus, comprising: (a) a pot for receiving items to be cooked, said pot having a rim surrounding an open region having inner sides; said rim having first and second opposing pouring regions; (b) a lid adapted to cover said open region and a portion of the rim of the pot, said lid includes a flange adapted to slidably engage with the inner sides of the pot; said flange having first and second opposing regions of perforations; and (c) means for securing the lid to the container; said lid being operable between a first and second position; where in said first position the lid is secured to the pot by the means for securing and the first region of perforations of the flange is in fluid communication with the first pouring region of the rim and the second region of perforations of the flange is in fluid communication with the second pouring region of the rim, whereby the items in the pot can be strained from one of the pouring regions; and in said second position the lid is released from the means for securing and the regions of perforations in the flange are covered by the inner sides of the pot.

BRIEF DESCRIPTION OF THE DRAWINGS

Embodiments of the invention will be described by way of example in conjunction with drawings in which.

DETAILED DESCRIPTION OF THE PREFERRED EMBODIMENTS

Figure 1:
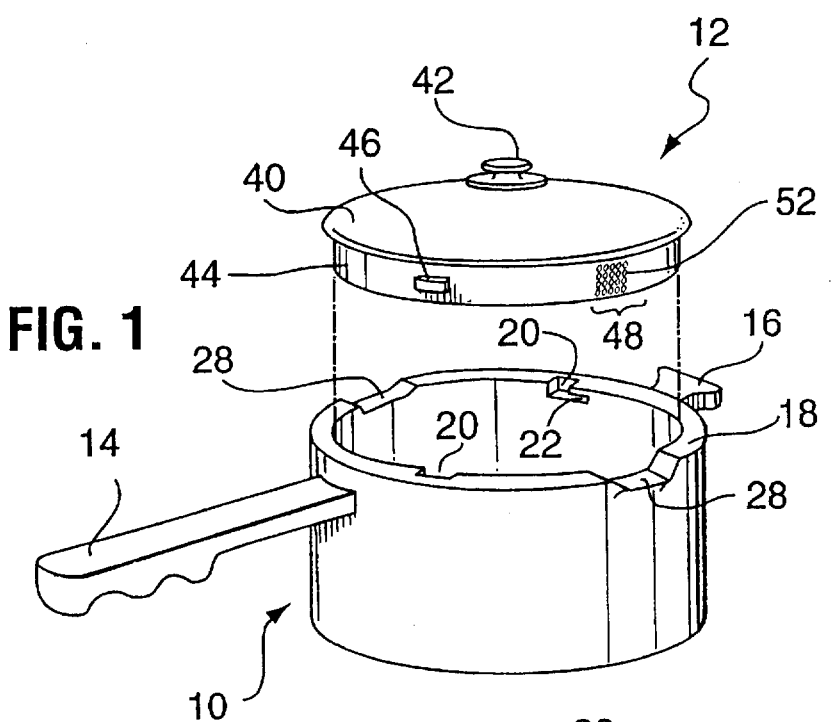
FIG. 1 is a perspective view of the cookware including a pot and a lid shown in an elevated position according to an embodiment of the present invention.
Figure 2:
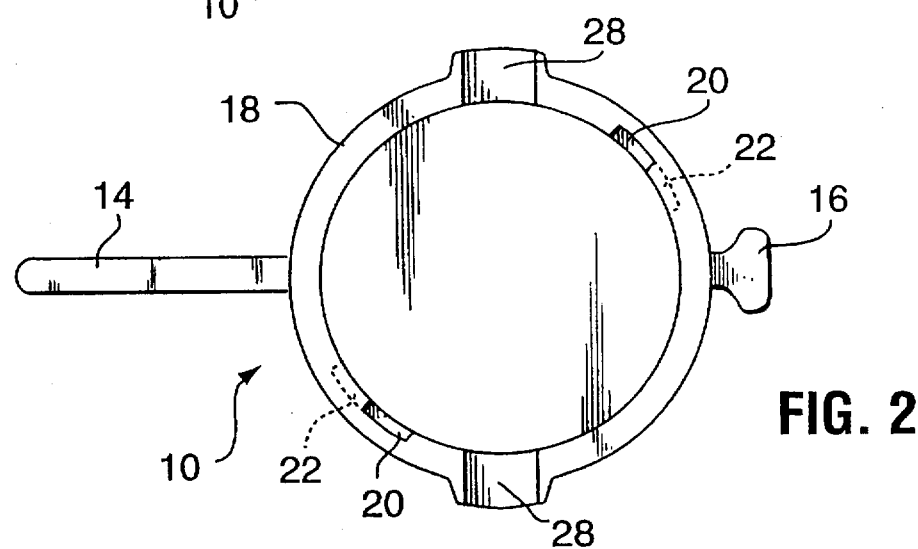
FIG. 2 is a top view of the pot of FIG. 1.

FIG. 1 illustrates a container pot 10 and a strainer lid 12. The pot 10 includes a main handle 14, a secondary handle 16 and an upper rim 18 having two notches 20 located opposite each other with each notch 20 being proximate to the handles 14 and 16. Each one of the notches 20 are communication with a receiving channel 22 located below the rim 18 of the pot 10 (best seen in FIG. 4). The pot 10 includes a pair of dipped outer edges 28 located on the upper rim 18 at right angles to the handles 14 and 16.

Figure 3:
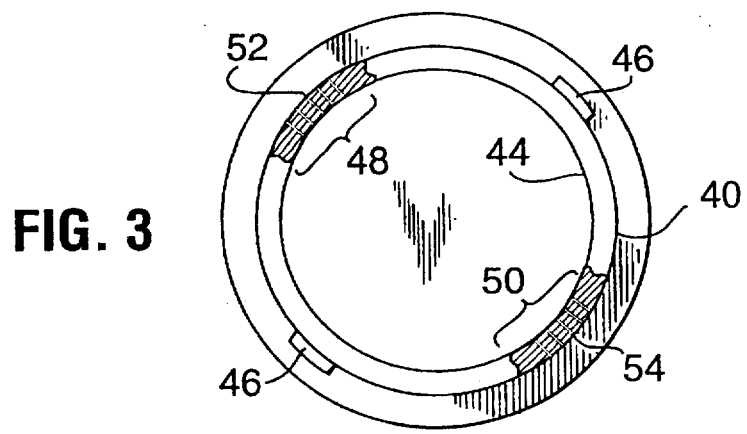
FIG. 3 is a bottom view of the lid of FIG. 1.
Figure 4:
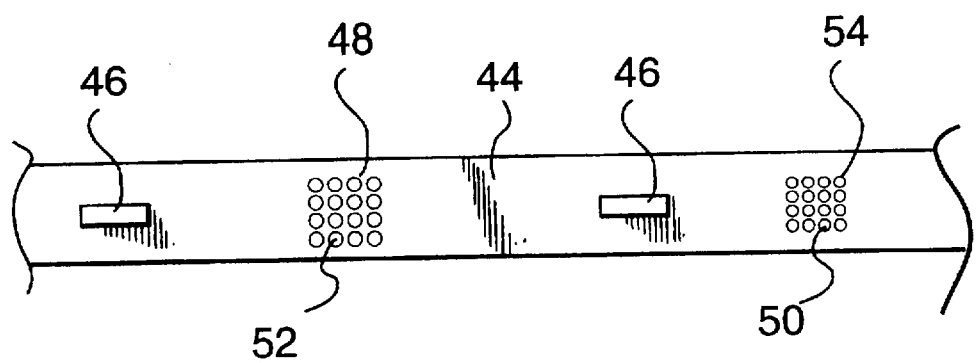
FIG. 4 is a broken extended side view of the flange of the lid of FIG. 1.
Figure 5:
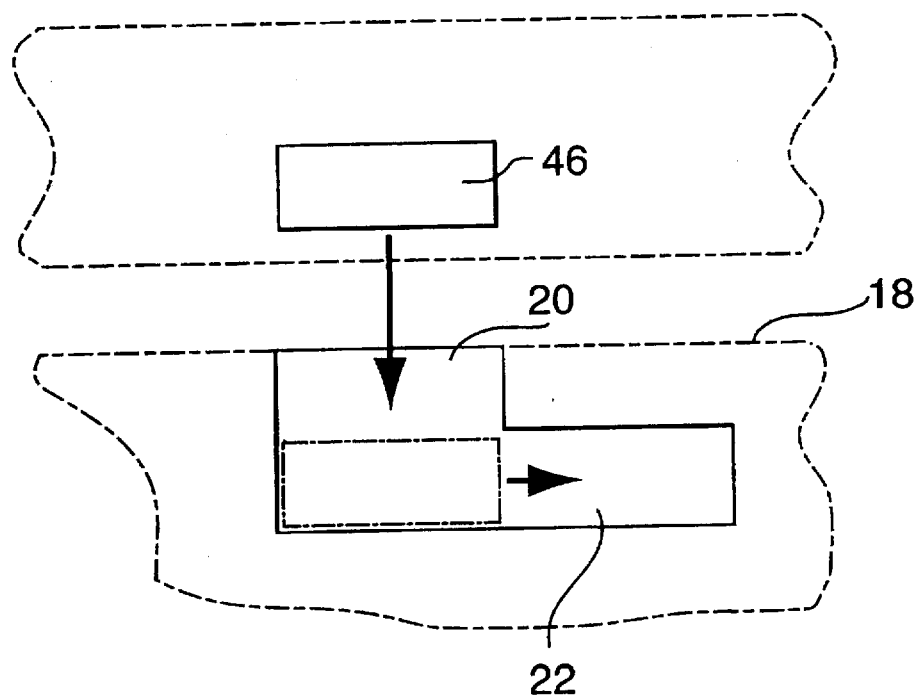
FIG. 5 is a partial schematic view of the protrusion element of the lid and the notch and the receiving channel of the pot.

The strainer lid 12 includes a domed outer cover 40 and a knob 42 for lifting and placing the cover 40 on the pot 10. The outer cover 40, shown in bottom view in FIG. 3, includes a circumferentially extending flange 44. The flange 44 of the outer cover 40 fits just inside the pot 10 with a portion of the cover 40 resting on the rim 18 of the pot 10. The flange 44 includes two opposing protrusion elements 46 and two opposing perforation regions 48 and 50 (an expanded view of the flange 44 is shown in FIG. 4). Perforation region 48 contains large apertures 52 and perforation region 50 contains small apertures 54 to facilitate two different straining flow rates.

The notch 20 in the rim 18 of the pot 10 is the same length and approximately twice the width of the protrusion elements 46. The receiving channel 22 has the same width and approximately twice the length of the protrusion elements 46. This geometry allows for simple insertion of the protrusion elements 46 into the notches 20 and ultimate sliding locked engagement with the receiving channels 22.

To position the lid 12 on the pot 10, the protrusion elements 46 are positioned within the notches 20 in the rim 18 of the pot 10. The lid 12 can then be rotated, using the knob 42, such that each one of the protrusion elements 46 slides into its corresponding receiving channel 22 to secure the lid 12 to the pot 10. When the lid 12 is secured in this manner the perforation regions 48 and 50 are aligned with the dipped outer edges 28.

During regular (non-straining) cooking operations the strainer lid 12 is positioned on the pot 10 with the protrusion elements 46 resting the notches 20 in the rim 18, but not in the receiving channels 22. In this non-straining position, the lid 12 can be freely lifted from the pot 10 to monitor the contents within the pot 10 without allowing steam to escape from the pot 10 with the lid 12 in place.

To employ the straining function of the lid 12, the knob 42 is used to rotate the outer cover 40 into a secured locked position by sliding the protrusion elements 46 into the receiving channels 22 as previously discussed. In this straining position the perforation regions 48 and 50 are aligned with the dipped outer edges 28 of the pot 10 to allow for smooth and accurate draining.

To return the pot 10 and lid 12 to the non-straining position, the knob 42 is used to slide the protrusion elements 46 out of engagement with the receiving channels 22 such that the protrusion elements 46 are returned to a position in the notches 20.

We claim:

1. A cooking apparatus, comprising:

(a) a container for receiving items to be cooked, said container having a rim surrounding an open region having inner sides; said rim having a pouring region;

(b) a lid adapted to cover said open region and a portion of the rim of the container, said lid includes a flange adapted to slidably engage with the inner sides of the container; said flange having a region of perforations; and (c) means for securing the lid to the container; said lid being operable between a first and a second position; where in said first position the lid is secured to the container by the means for securing and the region of perforations of the flange is in fluid communication with the pouring region of the rim, whereby the items in the container can be strained; and in said second position the lid is released from the means for securing and the region of perforations in the flange is covered by the inner sides of the container.

2. The cooking apparatus of claim 1, wherein the means for securing includes a protrusion element connected to the flange of the lid, and the rim of the container includes a notch and channel that extends into the inner sides of the container, said notch and channel being adapted to receive said protrusion element.

3. The cooking apparatus of claim 2, wherein the flange of the lid extends circumferentially about the entire lid.

4. The cooking apparatus of claim 3, wherein the pouring region includes a first dipped outer edge.

5. The cooking apparatus of claim 4, wherein the region of perforations in the flange cover includes a first and second opposing section of perforations.

6. The cooking apparatus of claim 5, wherein the first section of perforations include small apertures and the second section of perforations include large apertures.

7. The cooking apparatus of claim 6, further including a second dipped outer edge opposing the first dipped outer edge, such that when the lid is in the first position the first section of perforations is generally aligned with the first dipped outer edge and the second section of perforations is generally aligned with the second dipped outer edge.

8. A cooking apparatus, comprising:

(a) a pot for receiving items to be cooked, said pot having a rim surrounding an open region having inner sides; said rim having first and second opposing pouring regions;

(b) a lid adapted to cover said open region and a portion of the rim of the pot, said lid includes a flange adapted to slidably engage with the inner sides of the pot; said flange having first and second opposing regions of perforations; and (c) means for securing the lid to the container; said lid being operable between a first and a second position; where in said first position the lid is secured to the pot by the means for securing and the first region of perforations of the flange is in fluid communication with the first pouring region of the rim and the second region of perforations of the flange is in fluid communication with the second pouring region of the rim, whereby the items in the pot can be strained from one of the pouring regions; and in said second position the lid is released from the means for securing and the regions of perforations in the flange are covered by the inner sides of the pot.

9. The cooking apparatus of claim 8, wherein the means for securing includes a pair of opposing protrusion elements connected to the flange of the lid, and the rim of the pot includes a pair of opposing notches and channels that extend into the inner sides of the pot, each one of the notches and channels being adapted to receive a respective one of the protrusion elements.

10. The cooking apparatus of claim 8, wherein the flange of the lid extends circumferentially about the entire lid.

11. The cooking apparatus of claim 8, wherein the pouring regions are dipped outer edges.

12. The cooking apparatus of claim 11, wherein the first section of perforations include small apertures and the second section of perforations include large apertures.

* * * * *